United States Patent
Short et al.

(10) Patent No.: US 6,194,992 B1
(45) Date of Patent: *Feb. 27, 2001

(54) MOBILE WEB

(75) Inventors: Joel E. Short; Leonard Kleinrock, both of Los Angeles, CA (US)

(73) Assignee: Nomadix, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/839,977

(22) Filed: Apr. 24, 1997

(51) Int. Cl.[7] .................................................. G07D 7/00
(52) U.S. Cl. ...................... 340/5.9; 340/5.91; 235/380; 235/382.5
(58) Field of Search ............................... 235/375, 382.5, 235/441, 275, 380, 381, 382, 388.5; 340/820.31, 825.34; 360/99.01; 345/156

(56) References Cited

U.S. PATENT DOCUMENTS

| | | |
|---|---|---|
| 4,026,642 | 5/1977 | Tanaka et al. . |
| 4,233,661 | 11/1980 | Bolton et al. . |
| 4,509,277 | 4/1985 | Bolton . |
| 4,654,793 | 3/1987 | Elrod . |
| 4,806,743 | 2/1989 | Jean-Jacques Thenery . |
| 4,816,654 | 3/1989 | Anderl et al. . |
| 5,019,697 | 5/1991 | Postman . |
| 5,030,807 | 7/1991 | Landt et al. . |
| 5,149,945 | 9/1992 | Johnson et al. . |
| 5,287,269 | 2/1994 | Dorrough et al. . |
| 5,321,395 | 6/1994 | Van Santbrink . |
| 5,351,186 | 9/1994 | Bullock et al. . |
| 5,377,060 | * 12/1994 | Nigam ............................. 360/99.01 |
| 5,538,007 | * 7/1996 | Gorman .............................. 600/253 |
| 5,664,228 | * 9/1997 | Mital .................................... 710/62 |
| 5,727,950 | * 3/1998 | Cook et al. ......................... 434/350 |
| 5,768,384 | * 6/1998 | Berson ................................. 380/23 |
| 5,781,909 | * 7/1998 | Logan et al. ....................... 707/200 |
| 5,936,542 | * 8/1999 | Kleinrock et al. ............. 340/825.34 |

* cited by examiner

Primary Examiner—Steven Saras
Assistant Examiner—Fritz Alphonse
(74) Attorney, Agent, or Firm—Brooks & Kushman P.C.

(57) ABSTRACT

A system and method of interfacing includes a mobile web information exchange device. Information about a user is recorded on a mobile web recording medium. Information terminals are provided at locations which receive the mobile web recording medium. Information is stored on the Internet or terminals relating to the specific location. The mobile web recording medium, such as any media storage device, is connected to the terminals. A control is provided, either on the storage media or in the terminals for the interaction of the mobile web recording medium with the terminals. Thus information is exchanged by supplying the information about the user to the terminal and by recording selective information data from the terminal and/or Internet to the mobile web recording medium. Such exchange may be effected by inputting commands with a mouse or keyboard or touch screen connected to the terminals. The media storage device is then removed from the terminal and used at as many terminals as desired. The mobile web communicates information between workstations and users. Workstations may include open houses, learning centers, conventions/shows, gyms, and the like, and users may respectively be realtors, students, attendees, exercisers, and the like.

31 Claims, 10 Drawing Sheets

```
<HEAD><TITLE>The Real-Time Computer & Conference</TITLE></HEAD>

<FRAMESET COLS="135,*">

<FRAMESET ROWS="115,*" FRAMEBORDER="2" FRAMESPACING="2" BORDER="1">

<FRAME SRC="name.htm" NAME="name" FRAMEBORDER="2" FRAMESPACING="1" BORDER="1" SCROLLING="NO">

<FRAME SRC="vindex.htm" FRAMEBORDER="2" FRAMESPACING="1" BORDER="1" NAME="vindex" >

</FRAMESET>

FRAMESET ROWS="115,*" FRAMEBORDER="2" FRAMESPACING="2" BORDER="1">
```

Fig. 3-1

```
<FRAME SRC="sponser.htm" NAME="sponser" FRAME BORDER="2" FRAMESPACING="1" BORDER="1" SCROLLING="NO">

<FRAMEsrc="body.htm" NAME="body" FRAMEBORDER="2" FRAMESPACING="0" BORDER="1">

</FRAMESET>

</FRAMESET>

<NOFRAMES>Your Browser Does not Support Frames Please Download <a href="Http://www.netscape.com">Netscape </a>
</NOFRAMES>
```

Fig. 3-2

```
<!DCOTYPE HTML PUBLIC "-//IETF//DTD HTML//EN">
(html>

<body bgcolor="#FFFFFF">
<center>
<p align="center"><a href="exhbtrs.htm" target="body"
onmouseover="window.status='On IDisk MobileWeb'; return true"><font
color"#FF0000" size="2" face="Arial">Exhibiting Companies</font></a><f
ont
color="#FF0000" size="2" face="Arial"><br><br>
</font><a href="help.htm" target="body"
onmouseover="window.status='On IDisk MobileWeb'; return true"><font
color="FF0000" size="2" face="ARIAL">Help</font></a> </p>
<b>
<center><font color="000000" size="2" face="ARIAL">Exhibitors
Visited:</center></b> </font>

<p align="center"><a href="amc.htm" target="body"
onmouseover="window.status='On IDisk mobileWeb'; return true"><img
src="mweb/amc.jpg" align="center" width="95" height="19"><br>
<font color="#000000" size="1" face="ARIAL">Ampro Computers</font></a>
</p>

<p align="center"><a href="cet.htm" target="body"
onmouseover="window.status='On IDisk mobileWeb'; return true"><img src=
"mweb/cet.jpg" align="center" width="95" height="25"><br>
<font color="#000000" size="1" face="ARIAL">CETIA, Inc. </font></a>
</p>
```

Fig. 4

```
<HTML><BODY backgroung="mweb/back.jpg"><CENTER><P><A NAME="Top"></A></P
></CENTER> <H2 ALIGN=CENTER><B>Ampro Computers MobileWeb Page</B></
/H2><CENTER><P><A HREF>="http://www.ampro.com"target=body onMouseOver="w
indow.status='On The Internet'; return true">
<IMG SRC'MWeb/amc.jpg" ALT=Ampro Computers Logo" BORDER=0></A>
<BR CLEAR=BOTH><A HREF="http://www.ampro.com">Visit Our Homepage</A><P
></CENTER><BLOCKQUOTE><MENU> <LI><A HREF="#1"target=body onMouseOver="w
indow.status='On IDisk mobileWeb'; return true".Option A Introducing PC
/104-Plus</A></LI><LI><A HREF="#2"target=body onMouseOver="window.statu
s='On IDisk MobilWeb'; return true">Option B PCI Comparison Matrix</A>
</LI><LI><A HREF="#3"target=body onMouseOver="window.status='On IDisk M
obileWeb'; return true">Option C Real Time Software for PC/104</A></LI>
<LI><A HREF="#4"target=body onMouseOver="window.status='On IDisk Mobile
Web'; return true">OptionD Little Board Comparison Matrix</A></LI><?ME
NU></BLOCKQUOTE></B></H1></H2></H3></LI></P></CENTER></TABLE><BR><A NAM
E="1"></A><TABLE BORDER=3 WIDTH=100% CELLSPACING=2 CELLPADDING=2><TR><T
D><B></CENTER>MobilWeb</CENTER></B><TD><B><CENTER>Option A Introducing
PC/104-Plus</CENTER></B><TD><CENTER></B><A HREF="#Top"target=body onMous
eOver="window.status='On IDisk MobileWeb'; return true">Back to Top</A>
</B><?CENTER></tr></TABLE><BR>
<HTML>
<HEAD>
<META HTTP-EQUIV="Content-Type" CONTENT="text/html; charset=ISO-8850-1"
>
<TITLE>DESIGNING WITH PC/104</TITLE>

<META NAME="GENERATOR" CONTENT="Internet Assistant for Microsoft Word 2
```

Fig. 5-1

```
.03z">
</HEAD>
<BODY>
<P>
<ING SRC=mweb/IMG00004.GIF">
<HR>
<P>
<CENTER><FONT SIZE=1 FACE="Arial">990 Almanor Ave.  Sunnydale,
CA 94086  Phone (408) 522-2100  Fax (408) 720-1305  email info@ampro
.com</FONT></CENTER>
<P>
<CENTER><B><FONT SIZE=5 FACE="Arial">Introducing PC/104-<I><B>Plus
<BR>
</B></I><FONT></B></CENTER>
<P>
<B><FONT FACE="Arial">Brief history</FONT></B>
<P>
In February 1992, Ampro converted its "MiniModule" form-facto
r
into an open standard called the PC/104 Standard, and created
the non-profit PC/104 Consortium to serve as custodian of the
new standard. PC/104 rapidly became the most popular embedded-PC
standard, used almost universally as the modular basis of many
types of embedded systems. Over the past four years, several
hundred companies joined the PC/104 Consortium and together offer
```

MOBILE WEB

This application claims the benefit U.S. provisional application Ser. No. 60/016,136, filed Apr. 24, 1996.

BACKGROUND OF THE INVENTION

The invention is a novel way to develop and view a record of an individual's transactions using a Mobile Web. The invention is a data storage device that allows one to have a database of all the information gathered at different sites as well as for service providers to have a database of interested participants, and/or their activities either via the internet or through other communication channels including conferences, exhibitions, and other events.

With the advent of the internet and tele-conferencing along with numerous exhibitions, it is difficult for the organizers and participants of shows to keep track of the attendees as well as difficult for those attendees to keep track of all the information gathered at those sites. There is therefore a need for a device that can be easily carried along by attendees and by organizers for keeping track of each other and for exchanging information and constantly updating information on interested participants.

SUMMARY OF THE INVENTION

The present invention addresses that problem by providing a Mobile Web. The Mobile Web is similar to the World Wide Web which is accessible using a browser such as Netscape, except this Mobile Web need not rely on hosts or network access to retrieve pages of information (i.e., Web pages). This Mobile Web is even accessible without necessarily having any network-access (e.g., the Internet). All the information and navigational links are stored on any media storage device, such as a personal electronic recordable medium.

In a preferred embodiment, the mobile web ID system has a portable identification memory device with user's identification data stored in the memory device. Storage reader-writers at exhibitor locations having a memory storage for storing exhibitor information about the exhibitors are provided. Memory device slots in the reader-writers temporarily receive the portable memory devices with reading heads adjacent the slots reading the identification data into the storage and writing heads adjacent the slots writing stored exhibitor information into the portable identification memory device.

Preferably, the reader-writer is a computer and the memory storage is a computer. The portable identification memory device may preferably be a 3.5" floppy disk, a PCMCIA or PC Card, a smart card, a Flash card, a ZipDisk, a Floptical disk, a swipe card or the like.

In preferred embodiments, a convention information exchange system has an exhibitors station having a programmable computer with a program for automatically receiving and storing information from a user's identification data storage medium and for writing on that data storage medium information about the exhibitor and its products from a hard disk storage in the computer or from the Internet under control of the user according to the user's selection of menus on a screen on the computer via devices such as a keyboard, touch screen, or mouse connected to the computer. The user's identifying data is provided on the data storage medium such as identification data including the user's name, title, organization and addresses.

Preferably, a data storage device may be provided at plural locations each having a computer with a memory for storing and providing information data, a screen for displaying menus, a keyboard, touch screen, or a mouse for entering selections from the menu. A control is stored either on the user carried device or on the data storage device. The data storage device receives the user carried device and an interface in the data storage device receives and writes the identification data from the user carried device into the memory under direction of the control. Thus, the exhibitor information data from the memory is provided to the user carried device under direction of the control and the user's inputs on the input device.

In preferred embodiments, the user carried device includes a complementary user's interface and the exhibitor station computer interface comprises an interface for communicating data with the user's complementary interface by radio, infrared or wire. The control provides the exhibitor with a complete record of identification of users who visited the exhibitor's booth.

The data storage device is provided at exhibitor booths at a show or convention; or at manufacturing plants, where the information data comprises information about machines in the plants, and the user is an employee, such as a manager, checking on the machines by exchanging information about the machines via the user carried device. The data storage device may be provided at learning stations, and the user being a student exchanging information with the learning stations via the user carried device. The data storage device may be provided at home sales sites, and the user being a realtor exchanging information with the sites via the user carried device. The data storage device may be provided at gyms, with the user being an exerciser exchanging information with equipment in the gyms via the user carried device.

A preferred method of information exchange includes providing a mobile web recording medium to a user, recording information about the user on the mobile web recording medium, providing information terminals at locations for receiving the mobile web recording medium, storing information data on the terminals, communicating the mobile web recording medium with the terminals, providing a control for enabling the communicating of the mobile web recording medium with the terminals, exchanging information by supplying the information about the user to the terminal and by recording selective information data from or through the terminal to the mobile web recording medium by providing commands by inputting means, terminating communication of the mobile web recording medium with the terminal, and if desired repeating the above steps at a different terminal. Preferably, the terminals are computers. Inputting means may be a mouse, a keyboard, a touch screen, or the like attached to the terminals and the mobile web recording medium may be a floppy disk.

Preferably, the control is provided on the mobile web recording medium or the terminals as a batch of executable commands, scripts, or programs.

These and further and other objects and features of the invention are apparent in the disclosure, which includes the above and ongoing written specification, with the claims and the drawings.

BRIEF DESCRIPTION OF THE DRAWINGS

FIG. 1 is an attendee flow chart showing the operation of the invention.

FIG. 2 is an example of a web page print of a Mobile Web (MW) Home Page screen.

FIG. 3 shows the HTML code which generates the frame structure for FIG. 2.

FIG. 5 shows part of the HTML code gathered from an exhibitor with off-line and on-line navigational links and data.

FIG. 6 an example web page print of a Mobile Web page with the HTML code included as described in FIG. 5 for a particular exhibitor.

DETAILED DESCRIPTION OF PREFERRED EMBODIMENTS

The invention may be in the form of diskettes or other data storage devices. Data stored includes, but is not limited to, text files, Web pages, scripting code (e.g., Java), video clips (e.g., Quicktime or MPEG movies), audio clips, and any other forms of data readable or accessible through a Web browser.

Exemplary applications of this invention include (but are not limited to):

1. The record of an individual's visits to a sequence of exhibitor (i.e., vendor) booths at a trade show wherein that individual performs a data exchange transfer of information with various exhibitors using a computer readable/writable medium such as a floppy disk (e.g., an IDisk which is an Identification Disk and/or an Information Disk) which he carries with him. The information exchange transfers the individual's name and other of his relevant contact information to the exhibitor's computer (e.g., laptop) and/or certain items of the exhibitor's information may be selected manually or automatically to be transferred to his IDisk.

2. The record of an individual's (such as a manager or foreman) tour among a sequence of machines (stations) at a manufacturing plant wherein that individual exchanges information with these machines using a computer readable/writable medium such as a floppy disk (e.g., an IDisk which is an Identification Disk and/or an Information Disk) which he carries with him. The information exchange transfers the individual's name and other of his relevant contact information to the machine's computer (e.g., imbedded or attached digital device) and certain pieces of the machine's status information (e.g., backlog of work, throughput. operating parameters, temperature, throughput, etc.) may be selected by the individual to be transferred back to his IDisk.

3. The record of a student's tour through an 'automated school' wherein that student exchanges information with various learning stations using a computer readable/writable medium such as a floppy disk (e.g., an IDisk which is an Identification Disk and/or Information Disk) which he carries with him. The information exchange transfers the student's name, duration of visit at this station, and other of his relevant contact information to the learning station's computer and certain information at the learning station may be selected by the student to be transferred back to his IDisk.

4. The record of a real-estate agent's travels through a tour of open houses wherein that agent exchanges information with computers at the open houses using a computer readable/writable medium such as a floppy disk (e.g., an IDisk which is an Identification Disk and/or Information Disk) which he carries with him. The information exchange transfers the agent's name and other of his relevant contact information to the open house computer (e.g., laptop) and certain pieces of information about the open house may be selected by the agent to be transferred to his IDisk.

5. The record of an exerciser's workout on various pieces of gym equipment wherein that individual exchanges information with the equipment, computer, and/or kiosk at the gym using a machine readable/writable medium such as a floppy disk (e.g., an IDisk which is an Identification Disk and/or Information Disk) which he carries with him. The information exchange transfers the exerciser's profile such as name, weight, height, workout history, health limitations, etc. to be used by each piece of equipment. Information from the equipment (such as reps. weight, time and calories burned) is manually entered or automatically transferred to his IDisk for later retrieval and/or analysis.

The Mobile Web is also able to link in with information stored onto the IDisk through systems other than the exhibitor booths (which are detailed below), message center. or a documentation sales center, etc. For example, messages retrieved at the message center are stored onto the IDisk and linked in as part of the Mobile Web.

The IDisk initially contains a Mobile Web Home Page (the MW Home Page) from which booths visited and information gathered is accessed. In essence, this home page on the IDisk is dynamically modified as the attendee updates information on the IDisk.

The attendee collects information from each visited exhibitor by inserting his IDisk into the exhibitor's laptop computer. The laptop contains software plus exhibitor-specific information which the attendee selects to be loaded onto his IDisk. This information is placed onto the IDisk in such a way as to dynamically create a Mobile Web or MW, (i.e., a set of Web pages or various links between them). This dynamic creation of the MW is based upon the attendee's actions, namely:

a) which booths are visited b) what data he selects from the exhibitor

The MW creation is also based upon the attendee's preferences, such as keywords that he has loaded onto his IDisk; based on these preferences, the system automatically loads exhibitor information that is relevant to these key words. The actions that are taken in creation of the MW are:

Selected data (selected either explicitly by the attendee via options shown on the exhibitor's computer screen, or implicitly, via key word relevancy) is copied from the computer onto the IDisk.

Links among the collected pages are created on the IDisk.

All the information collected at a particular booth is dynamically updated on the IDisk which is accessed from the Web page contains and/or created specific to that exhibitor. Each exhibitor's Web page is linked not only up to the Mobile Web Home Page but also down to each individual piece of data collected onto the IDisk from that exhibitor. Other dynamic links may link to data not stored on the IDisk itself but that exist on the World Wide Web which can be accessed through the appropriate Universal Resource Locator (URL). All the Mobile Web information stored on the IDisk is retrieved through a Web Browser.

After the show, the attendee may then view the data he has collected on a computer as follows:

1. The IDisk is inserted into the computer's floppy drive;

2. As an option, the user may choose to copy the IDisk contents directly to his hard drive;

3. An application on the IDisk (or its image on the hard disk) is started. This is done as follows:

1) First activate the ability to browse the Mobile Web by:

a) In its simplest form, from the file manager, (e.g. Windows File Manager, Explorer, Apple Finder, etc.) the user views the drive in which the IDisk was inserted (probably "A:"), the user then loads the file "INDEX.HTM". This will load the Web Browser and the MobileWeb Home Page.

b) In a more sophisticated fashion, the user load their Web Browser. (Note: The user does not have to be connected to the Internet in order to use the IDisk; ignore any error messages from the Web Browser at this point.)

Under the "File"menu option, the user selects "Open File" to load the file "INDEX.HTM" from the IDisk.

2) Secondly the collected data on the IDisk may then be read as follows:

i) Off-line: Without a network connection to the (World Wide Web), the user uses all the functionality built into the browser to view his collected data which was created at the trade show in Web-readable form. The user interface is identical to that of a Web page. The selected data from the exhibitor looks just like a Web page produced by the exhibitor. All links are active (click on a menu item which was copied from the exhibitor's computer and the user jumps to a page which displays the text or graphics that he had copied at the show). The user navigates, copies, etc., in all the usual ways as when on-line except the user is off-line from the WWW.

ii) On-line: If the user's computer is connected on-line to the World Wide Web, then the functionality in part (3b) is enhanced with the ability to click on exhibitor icons or other hyperlinks that were also created by the MW software at the trade show. These exhibitor icon links are now active and once selected, the user is linked through the WWW to the exhibitor's home page. Of course the user has the full availability of the WWW as well as MW Web access to the data he collected at the show. When the user is on-line, information from the WWW may appear automatically on the attendees Mobile Web pages.

In addition to the above:

1. All information from all trade show exhibitors (plus all or partial material from any related components of the event such as technical conference proceedings, etc.) may be prepackaged on some storage medium (CD ROM, Magnetic disk, etc.) in MW format so that it is viewed as described earlier. The user "visits" booths of his choice to create his personal IDisk as well at any time before, during or after the show.

2. On the World Wide Web there may be a dynamic Web Mall (Virtual Exhibition) that acts as a continuing trade show and/or conference with the attendees "visiting" the mail on the Web in the same way he would at the physical trade show. That is, he downloads from the Web to his local disk the data he wanted to use to create a MW of his visit trail to the mall, and updates the visits over time. Indeed, he may have agents in the background that continually update these selected entries as they themselves were updated on the exhibitor's home pages. Moreover, the agent based keyword searching of this mail generates entries for his MW.

FIG. 1 shows an Attendee Flow Chart briefly summarizing the process of the invention.

FIG. 2 shows a Web page print (generated by the Web browser Netscape) as an example of the MW Home Page screen that an attendee sees when the Web or MW browser is started up.

FIG. 2 shows a web page print (generated by the Web browser Netscape) as an example of the MW Home Page screen that an attendee sees when the Web or MW browser is started up. The top left corner of the screen contains the name of the attendee who this MW Home Page has been customized for along with a link to the MW Home Page by clicking on the IDisk icon. The top right box on the screen displays sponsorship information which can be accessed by clicking on the information in that box. The bottom left box provides links to a complete list of exhibiting companies and links to their web pages. In this box is also a list of companies that the attendee visited at the show which can be selected by the attendee to load that exhibitor's MW page. The bottom right box on the screen displays general show information and links to subsequent pages of information and web pages.

FIG. 3 shows an HTML coded file (INDEX.HTM) which determines the frame structure for the MW home page illustrated in FIG. 2. This file is initially created when the IDisk is prepared for the attendee's use at a show.

Figure 4:
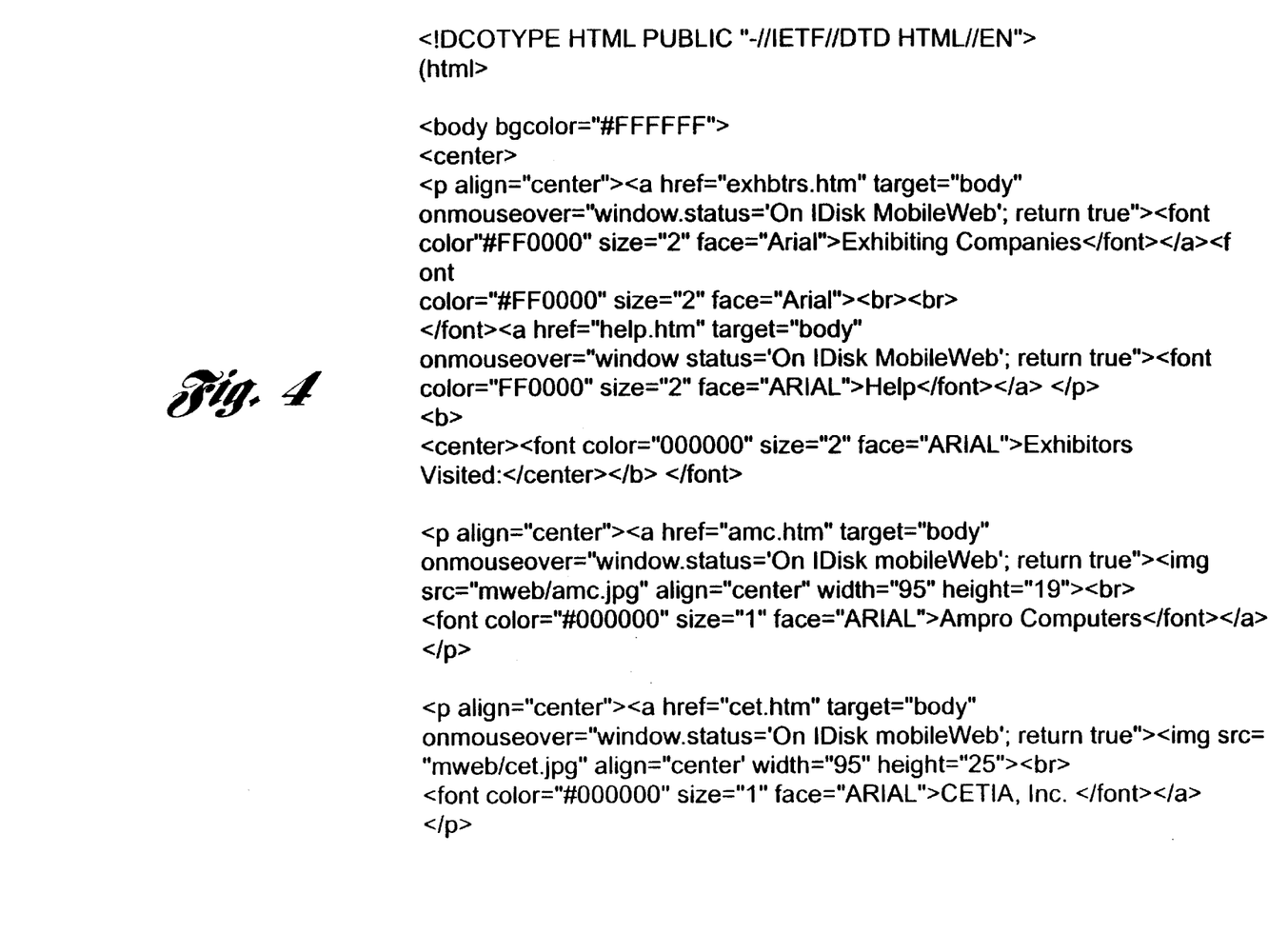
FIG. 4 shows the HTML code dynamically updated at each exhibitor station.
Figure 11:
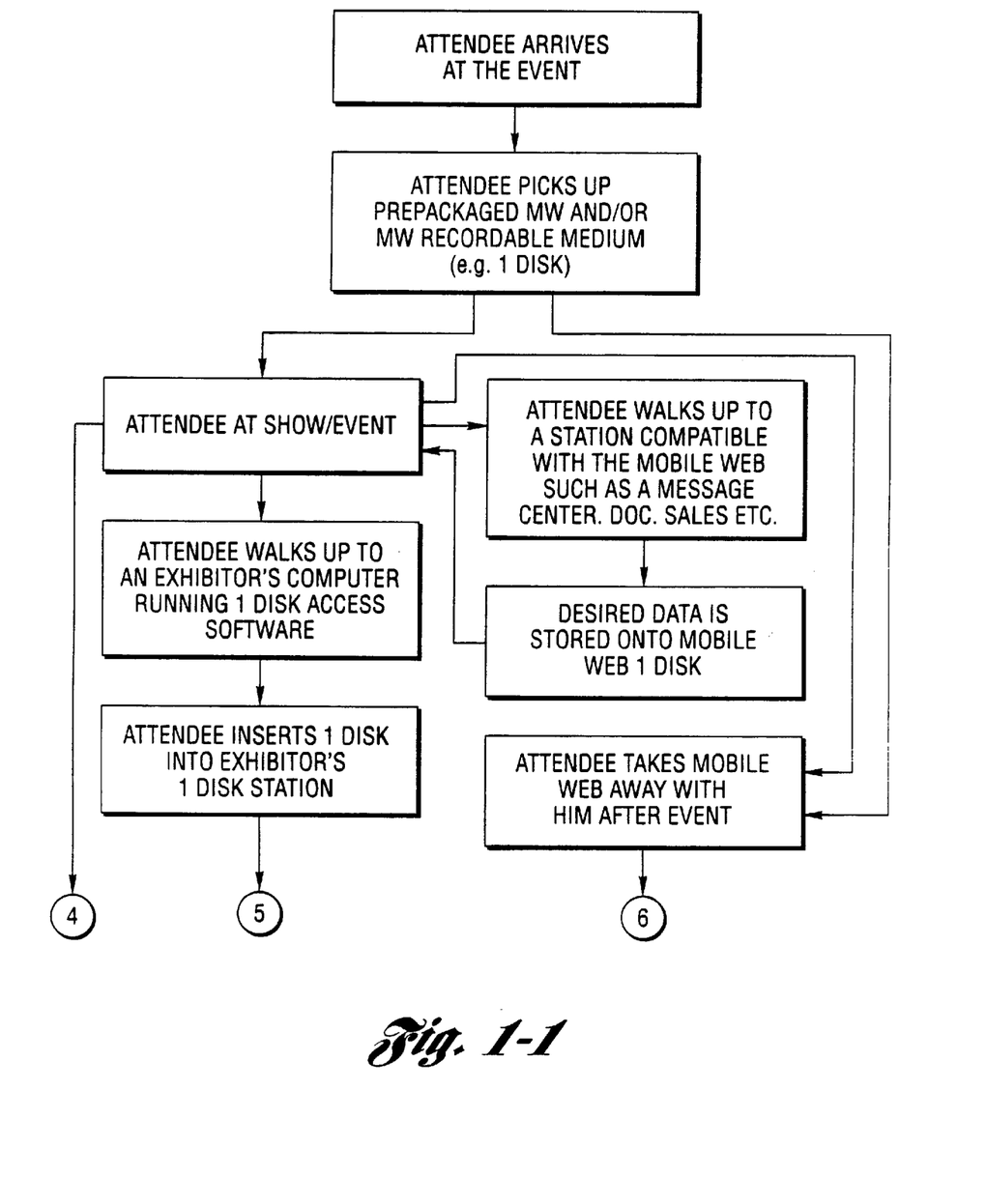

FIG. 4 shows an HTML coded file (VINDEX.HTM) which is initially created when the IDisk is prepared for the attendee's use at a show. This file is dynamically updated as the attendee (owner of the IDisk on which this file is stored) moves from booth to booth. This file contains a link to that exhibitor's MW page. This file generates the lower left box illustrated in FIG. 2.

FIG. 5 shows an HTML coded file (AMC.HTM) which is dynamically created at the exhibitor station when an attendee selected the information to be loaded onto the IDisk. This file contains navigation links generated by the control program along with links and data content from the exhibitor's station. The first page of code illustrated here produces the lower right corner of the box shown in FIG. 6.

FIG. 6 illustrates an example set of exhibitor information (in this example with Ampro Computers) collected from the exhibitor. As an example to the content of the exhibitor information collected, at the top of the page is the company name and link to that company's home page. Below that is an index to collected information. By selecting an index, that particular item is then displayed on the screen. At the top of each section is a link to return "Back To Top" to get back to the initial index.

While the invention has been described with reference to specific embodiments, modifications and variations of the invention may be constructed without departing from the scope of the invention, which is defined in the following claims.

We claim:

1. A mobile web ID system comprising a portable identification memory device, user's identification data stored in the memory device, a plurality of user-defined preferences stored in the portable identification memory device, plural storage reader-writers at exhibitor locations having a control for automatically receiving and storing information from a portable identification memory device, wherein the plural storage reader-writers are linked to or have a memory storage for storing exhibitor information about the exhibitors, and memory device slots in the reader-writers for temporarily receiving the portable memory devices, reading heads adjacent the slots for reading the plurality of user-defined preferences and the identification data into the storage, and writing heads adjacent to the slots for automatically writing stored Mobile Web information into the portable identification memory device from the memory storage of the storage reader-writers to the portable identification memory devices based on selections matching the plurality of user-defined preferences for retrieval and review at a remote location.

2. The system of claim 1, wherein the reader-writer is a computer.

3. The system of claim 1, wherein the memory storage is a computer.

4. The system of claim 1, wherein the memory storage is World Wide Web.

5. The system of claim 1, wherein the portable identification memory device is a 3.5" floppy disk.

6. The system of claim 1, wherein the portable identification memory device is a PCMCIA or PC Card.

7. The system of claim 1, wherein the portable identification memory device is a smart card.

8. The system of claim 1, wherein the portable identification memory device is a Flash card.

9. The system of claim 1, wherein the portable identification memory device is a ZipDisk.

10. The system of claim 1, wherein the portable identification memory device is a Floptical disk.

11. The system of claim 1, wherein the portable identification device is a swipe card.

12. An interface system comprising a user carried device with identification data including the user's name, title, organization and addresses and a plurality of user-defined preferences, a data storage device provided at plural locations each having a computer with a memory for storing and providing information data, a screen for displaying menus, a keyboard, a touch screen, or a mouse for entering selections from the menu, a control stored on the data storage device, a slot for receiving the user carried device and an interface in communication with the control on the data storage device for receiving and writing the identification data from the user carried device and the plurality of user-defined preferences into the memory under direction of the control and for automatically providing the exhibitor information data from the memory to the user carried device based on the plurality of user-defined preferences under direction of the control on the data storage device and a user's inputs on the keyboard, the touch screen or the mouse for retrieval and review at a remote location.

13. The system of claim 12, wherein the user carried device is a 3.5" floppy diskette.

14. The system of claim 12, wherein the user carried device is a swipe card.

15. The system of claim 12, wherein the user carried device includes a complementary user's interface and the exhibitor station computer interface comprises an interface for communicating data with the users complementary interface by radio, infrared or wire.

16. The system of claim 12, wherein the control provides the exhibitor with a complete record of identification of users who visited the exhibitors booth.

17. The system of claim 16, wherein the control provides a complete record of users responses to menus displayed on the exhibitors computer screens.

18. The system of claim 12, wherein the control provides a complete record of users who visited an exhibitors booth.

19. The system of claim 12, wherein the data storage device is provided at exhibitor booths at a show or convention.

20. The system of claim 12, wherein the data storage device is provided at manufacturing plants, the information data comprises information about machines in the plants, and wherein the user is an employee exchanging information about the machines via the user carried device, wherein the data storage device receives information written from the user carried device and the user carried device receives information written from the data storage device.

21. The system of claim 12, wherein the data storage device is provided at learning stations, and wherein the user is a student exchanging information with the learning stations via the user carried device.

22. The system of claim 12, wherein the data storage device is provided at home sales sites, and wherein the user is a realtor exchanging information with the sites via the user carried device.

23. The system of claim 12, wherein the data storage device is provided at gyms, and wherein the user is an exerciser exchanging information with equipment in the gyms via the user carried device, wherein the data storage device receives information written from the user carried device and the user carried device receives information written from the data storage device.

24. A method of information exchange comprising providing a mobile web recording medium to a user, recording information about the user on the mobile web recording medium, recording a plurality of pre-defined preferences on the recording medium, providing information terminals at locations for receiving the mobile web recording medium, storing information data on the terminals, communicating the mobile web recording medium with the terminals, providing a control for enabling the communication of the mobile web recording medium with the terminals, exchanging information by supplying the information about the user from the recording medium and the plurality of user-defined preferences on to the terminal and by recording selective information data from the terminal to the mobile web recording medium based on commands from the inputting means and the control based on the plurality of user-defined preferences, terminating communication of the mobile web recording medium with the terminal, and if desired repeating the above steps as a different terminal.

25. The method of claim 24, wherein the terminals are computers.

26. The method of claim 24, wherein the providing the commands by inputting means is by using a mouse attached to the terminals.

27. The method of claim 24, wherein the providing the commands by inputting means is by using a keyboard attached to the terminals.

28. The method of claim 24, wherein the portable mobile web recording medium is a floppy disk.

29. The method of claim 24, wherein the control provided on the mobile web recording medium is an executable program.

30. The method of claim 24, wherein the control is provided in the terminals, and wherein the control is an executable program.

31. The method of claim 24, wherein providing the commands by inputting means is by using a touch screen attached to the terminals.

* * * * *